(12) United States Patent
Hsiao et al.

(10) Patent No.: US 8,699,986 B2
(45) Date of Patent: Apr. 15, 2014

(54) BASE STATION AND NON-REAL TIME DATA TRANSMISSION METHOD THEREOF

(75) Inventors: Yu-Fang Hsiao, Taoyuan County (TW); Lu-Wei Chen, Taipei (TW); Shiann-Tsong Sheu, Taipei (TW); Jenhui Chen, New Taipei (TW)

(73) Assignee: Institute for Information Industry, Taipei (TW)

( * ) Notice: Subject to any disclaimer, the term of this patent is extended or adjusted under 35 U.S.C. 154(b) by 60 days.

(21) Appl. No.: 13/417,700

(22) Filed: Mar. 12, 2012

(65) Prior Publication Data

US 2013/0157707 A1 Jun. 20, 2013

(30) Foreign Application Priority Data

Dec. 15, 2011 (TW) .............................. 100146458 A (51) Int. Cl.
*H04B 1/16* (2006.01)
(52) U.S. Cl.
USPC ...................... 455/343.1; 455/127.5; 370/311
(58) Field of Classification Search
USPC .......... 455/343.1, 343.2, 343.5, 127.1, 127.5; 370/311, 310, 328
See application file for complete search history.

(56) References Cited

U.S. PATENT DOCUMENTS 7,693,555 B2 * 4/2010 Srinivasan et al. ............ 455/574
8,259,634 B2 * 9/2012 Srinivasan et al. ............ 370/311
8,289,891 B2 * 10/2012 Ji et al. ............................ 370/311
8,325,640 B2 * 12/2012 Park et al. ...................... 370/311
8,351,848 B2 * 1/2013 Mohanty et al. .............. 455/11.1
2011/0002253 A1 1/2011 Cha

FOREIGN PATENT DOCUMENTS

KR 10-2008-0076631 8/2008
KR 10-2009-0093752 9/2009

OTHER PUBLICATIONS

Korean Office Action for corresponding Korean Application No. 10-2012-0032691; issued Jun. 17, 2013.

* cited by examiner

*Primary Examiner* — Sonny Trinh
(74) *Attorney, Agent, or Firm* — Greer, Burns & Crain, Ltd.

(57) ABSTRACT

A base station and a non-real time data transmission method thereof are provided. The base station connects to a mobile apparatus via a network, and exchanges data with the mobile apparatus during a data transmission interval. The base station records a sleep cycle interval which comprises a sleep interval and a listening interval. The base station determines a sleep ratio relation, a transmission efficiency relation and a packet delay relation according to the sleep interval, listening interval and data transmission interval. The base station determines a sleep interval value based on the sleep ratio relation, transmission efficiency relation and packet delay relation so that the base station exchanges the non-real time data with the mobile apparatus, while saving energy and transmitting data efficiently.

8 Claims, 6 Drawing Sheets

Enabling the base station to determine a measurement function according to the difference between the sleep ratio relation and the optimal sleep ratio relation, the first weight value, the difference between the transmission efficiency relation and the optimal transmission efficiency relation, the second weight value, the difference between the packet delay relation and the optimal packet delay relation, and the third weight value     407a Enabling the base station to calculate an optimal solution of the sleep interval corresponding to the measurement function     407b

FIG. 4B

Enabling the base station to determine another measurement function according to the difference between the sleep ratio relation and the optimal sleep ratio relation, the first weight value, the difference between the transmission efficiency relation and the optimal transmission efficiency relation, the second weight value, the difference between the packet delay relation and the optimal packet delay relation, and the third weight value     407c Enabling the base station to calculate an optimal solution of the sleep interval corresponding to the another measurement function     407d

FIG. 4C

BASE STATION AND NON-REAL TIME DATA TRANSMISSION METHOD THEREOF

This application claims priority to Taiwan Patent Application No. 100146458 filed on Dec. 15, 2011, which is hereby incorporated by reference in its entirety.

CROSS-REFERENCES TO RELATED APPLICATIONS

Not applicable.

BACKGROUND OF THE INVENTION

1. Field of the Invention

The present invention relates to a base station and a non-real time data transmission method thereof. More particularly, the base station and the non-real time data transmission method thereof of the present invention transmit data by adopting a dynamically adjustable sleep cycle of a fixed length.

2. Descriptions of the Related Art

In the prior art, insufficient battery endurance of mobile apparatuses is usually a problem that is difficult to solve. Therefore, to save the power of mobile apparatuses, sleep mechanisms are generally adopted in network protocols. Specifically, a sleep cycle comprising a sleep interval and a listening interval is defined by a base station; the mobile apparatus is also simultaneously informed of this sleep cycle. Then, the mobile apparatus can enter a hibernation mode during the sleep interval and communicate data during the listening interval. In this way, the mobile apparatus can save power and transmit data.

On the other hand, the sleep mechanism must be adjusted correspondingly in response to different data transmission manners. Specifically, data transmissions between the base station and the mobile apparatus are generally classified into real time data transmissions and non-real time data transmissions. Because non-real time data transmissions are not as urgent as real time data transmissions, sleep mechanisms for non-real time data transmissions in the prior art primarily adjust the sleep cycle by using sleep intervals that grow in an exponential manner.

Figure 1:
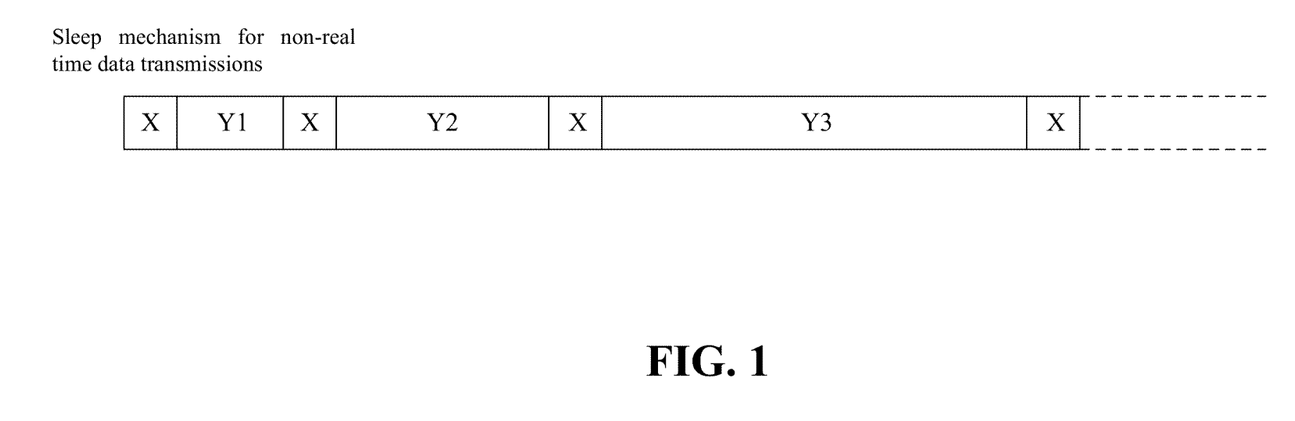
FIG. 1 is a schematic view of a sleep mechanism for non-real time data transmissions in the prior art.

FIG. 1 illustrates a schematic view of a sleep mechanism for non-real time data transmissions in the prior art. Furthermore, a sleep cycle suitable for non-real time data transmissions in the prior art comprises sleep intervals Y1, Y2, and Y3 and a listening interval X. Because of the non-urgent nature of non-real time data transmissions, the sleep intervals thereof may be designed to grow in an exponential manner (i.e., $S_i = S1 * 2^{(i-1)}$ as shown). In this way, the non-real time data transmissions may experience considerable time delays. However, because the non-real time data transmissions are not so urgent and the time duration in which the mobile apparatus stays in the hibernation mode can be extended in this way, a desirable power-saving effect can be achieved.

However, because various network services are developing more and more rapidly, the transmission performances of a lot of non-real time data have been improved accordingly. Correspondingly, time delays that are generated for the non-real time data transmissions in the sleep intervals need to be reduced. Therefore, if the prior art sleep mechanisms are still adopted for non-real time data transmissions, the performances thereof will be greatly restricted.

Accordingly, an urgent need exists in the art to achieve a balance between a desirable power-saving effect and short data transmission time delays for non-real time data transmissions.

SUMMARY OF THE INVENTION

To solve the aforesaid problem, the present invention provides a base station and a non-real time data transmission method thereof, which dynamically adjusts a length of a sleep interval according to a ratio of the sleep interval to a sleep cycle, efficiency of data transmission after a listening interval and a packet transmission delay status. In this case, sleep intervals have equal lengths.

To achieve the aforesaid objective, the present invention provides a non-real time data transmission method for use in a base station. The base station connects to a mobile apparatus via a network, and exchanges data with the mobile apparatus during a data transmission interval. The base station records a sleep cycle interval, which comprises a sleep interval and a listening interval. The non-real time data transmission method comprises the following steps: (a) enabling the base station to determine a sleep ratio relation according to the sleep interval, the sleep cycle interval and the data transmission interval; (b) enabling the base station to determine a transmission efficiency relation according to the listening interval and the data transmission interval; (c) enabling the base station to determine a packet delay relation according to a delay time interval of transmitting data to the mobile apparatus; and (d) enabling the base station to determine a sleep interval value according to the sleep ratio relation, the transmission efficiency relation and the packet delay relation.

To achieve the aforesaid objective, the present invention further provides a base station for a non-real time data transmission. The base station connects to a mobile apparatus via a network, and exchanges data with the mobile apparatus during a data transmission interval. A memory of the base station records a sleep cycle interval, which comprises a sleep interval and a listening interval. A processor of the base station is configured to determine a sleep ratio relation according to the sleep interval, the sleep cycle interval and the data transmission interval. The processor is further configured to determine a transmission efficiency relation according to the listening interval and the data transmission interval. The processor is further configured to determine a packet delay relation according to a delay time interval of transmitting data to the mobile apparatus. The processor is further configured to determine a sleep interval value according to the sleep ratio relation, the transmission efficiency relation and the packet delay relation.

According to the above technical disclosures, the base station and the non-real time data transmission method thereof according to the present invention can dynamically adjust the length of the sleep interval by evaluating, in real time, a ratio of the sleep interval to the sleep cycle, efficiency of data transmission after the listening interval and the packet transmission delay status to maintain a balance between a desirable power-saving effect and short data transmission time delays.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. However, these embodiments are not intended to limit the present invention to any specific environment, applications or particular implementations described in these embodiments. Therefore, the description of these embodiments is only for the purpose of illustration rather than limitation. It shall be appreciated that in the following embodiments and the attached drawings, elements not directly related to the present invention are omitted from depiction.

Figure 2A:
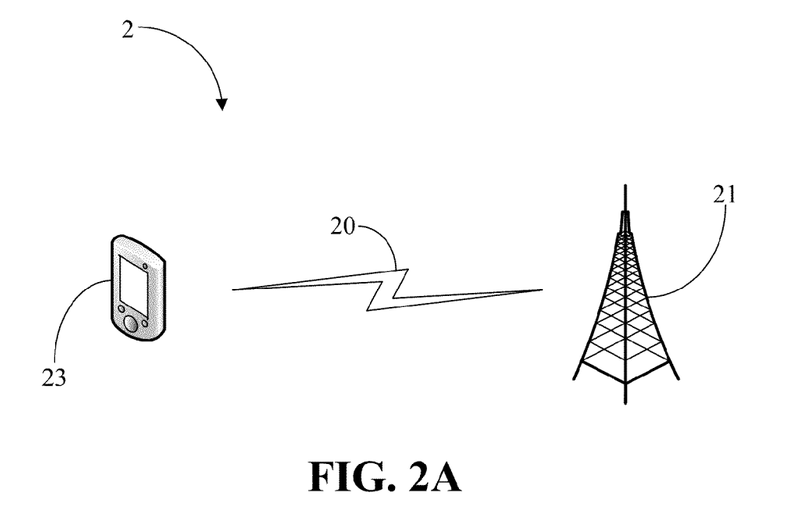
FIG. 2A is a schematic view of a wireless network according to a first embodiment of the present invention.
Figure 2B:
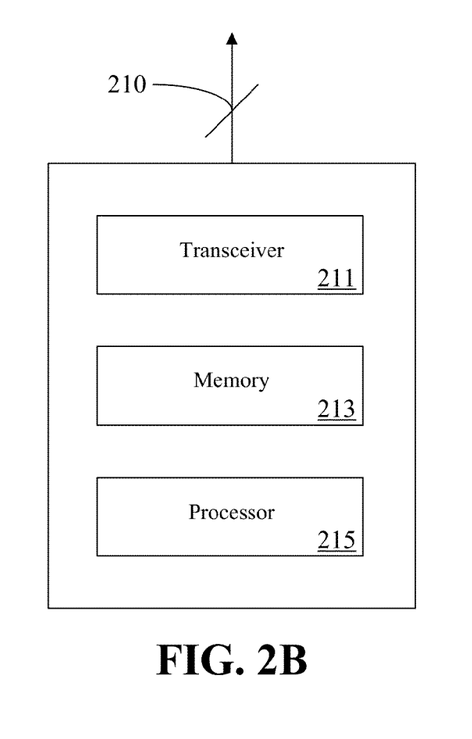
FIG. 2B is a schematic view of a base station according to the first embodiment of the present invention.
Figure 2C:
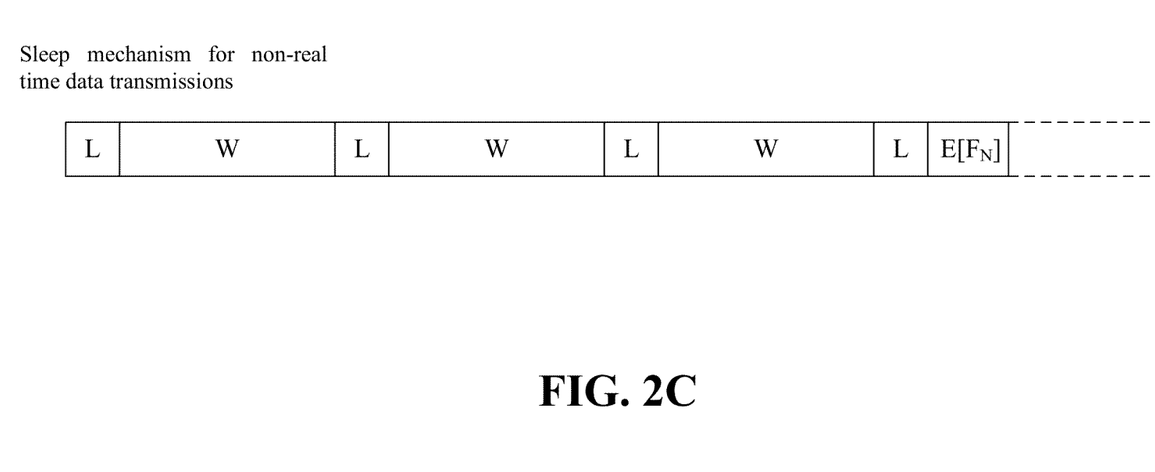
FIG. 2C is a schematic view of a sleep mechanism for non-real time data transmissions according to the first embodiment of the present invention.

Please refer to FIGS. 2A, 2B, and 2C. FIG. 2A is a schematic view of a wireless network 2 according to a first embodiment of the present invention. The wireless network 2 comprises a base station 21 and a mobile apparatus 23. FIG. 2B is a schematic view of the base station 21 according to the first embodiment of the present invention. The base station 21 comprises a transceiver 211, a memory 213 and a processor 215. FIG. 2C is a schematic view of a sleep mechanism for non-real time data transmissions according to the first embodiment of the present invention. The transceiver 211 of the base station 21 connects to the mobile apparatus 23 via a network 20, and exchanges data with the mobile apparatus 23 during a data transmission interval $E[F_N]$. The memory 213 of the base station 21 records a sleep cycle interval W+L, which comprises a sleep interval W and a listening interval L. Hereinbelow, the interactions between the network components will be further described.

First, because a ratio of the sleep interval W to the whole duration of the sleep mode is an important factor for saving power and transmitting data, the processor 215 of the base station 21 determines a sleep ratio relation (not shown) according to the sleep interval W, the sleep cycle interval W+L and the data transmission interval $E[F_N]$. The sleep ratio relation represents the ratio of the sleep interval W to the whole duration of the sleep mode. Furthermore, because a ratio of the data transmission interval $E[F_N]$ to an overall non-sleep time is also an important factor for saving power and transmitting data, the processor 215 of the base station 21 determines a transmission efficiency relation (not shown) according to the listening duration L and the data transmission interval $E[F_N]$. The transmission efficiency relation represents the ratio of the data transmission interval $E[F_N]$ to the non-sleep time.

Then, because a delay time of transmitting data from the base station 21 to the mobile apparatus 23 is also an important factor that affects the overall sleep interval, the processor 215 of the base station 21 determines a packet delay relation (not shown) according to a delay time interval of transmitting data to the mobile apparatus 23. It shall be particularly appreciated that the packet delay time interval between the base station 21 and the mobile apparatus 23 may be determined through a conventional packet transmission and response process or through packet delay estimation, and thus, will not be further described again herein.

Finally, because the sleep ratio relation, the transmission efficiency relation and the packet delay relation are the three most important factors that affect the balance between saving power and transmitting data, the processor 215 of the base station 21 determines a sleep interval value 210 of the sleep interval W according to the three factors. In this way, the base station 21 can inform the mobile apparatus 23 about the sleep interval value that needs to be used (i.e., the actual length of the sleep interval) via the transceiver 211, and exchange data with the mobile apparatus 23 subsequently according to the sleep interval value. It shall be particularly appreciated that the base station 21 may dynamically re-determine the sleep interval value according to the above disclosures so that the base station 21 can use adjusted sleep interval values for data transmissions in response to different data transmission conditions.

Furthermore, it shall be particularly appreciated that, because the sleep ratio relation, the transmission efficiency relation and the packet delay relation described above each have an optimal solution, the optimal solutions of the relations may be further used in the present invention as indices for determining the sleep interval value. In addition, because non-real time data of different protocols may have different requirements on the aforesaid factors, weight values may also be used to adjust the sleep interval value according to the importance of different factors.

Specifically, the memory 213 of the base station 21 may be further configured to store a first weight value, a second weight value and a third weight value (not shown) inputted by a user. The first weight value is related to the sleep ratio relation and is used to adjust a weight of the sleep ratio relation; the second weight value is related to the transmission efficiency relation and is used to adjust a weight of the transmission efficiency relation; and the third weight value is related to the packet delay relation and is used to adjust a weight of the packet delay relation.

Next, the processor 215 of the base station 21 is further configured to determine an optimal sleep ratio relation of the sleep ratio relation, an optimal transmission efficiency relation of the transmission efficiency relation and an optimal packet delay relation of the packet delay relation. Then, the processor 215 of the base station 21 determines the sleep interval value according to a difference between the sleep ratio relation and the optimal sleep ratio relation, the first weight value, a difference between the transmission efficiency relation and the optimal transmission efficiency relation, the second weight value, a difference between the packet delay relation and the optimal packet delay relation, and the third weight value.

Thus, by using the differences between the relations and the respective optimal solutions as the basis for determination as described above, the sleep interval value can be calculated more clearly according to the quantified relations. Furthermore, because weight values are used in combination with the relations respectively, the sleep interval value may be adjusted correspondingly by the user to coordinate with different network transmission states according to different network transmission environments and different requirements of different non-real time data on the sleep ratio relation, the transmission the efficiency relation and the packet delay relation.

To make the technological concepts of the present disclosure clearer, the present invention will be further described with reference to exemplary examples hereinbelow. However, it shall be particularly appreciated that the following descriptions are only intended to illustrate but not to limit the present disclosure. By way of example, $\lambda$ is set as an arrival rate of mean packet unit time, where the mean packet service time is set to 1 as is conventionally known. Then, when the first embodiment is taken as an example, a packet cumulant in the sleep interval W is $\lambda W$ during the sleep cycle interval W+L; and similarly, a packet cumulant in the listening interval L is $\lambda L$. Therefore, a packet cumulant in the sleep cycle interval W+L is $\lambda(W+L)$, and the service time in this part is $\lambda(W+L) \times 1$.

On the other hand, unprocessed packets will also be accumulated when the base station provides services during the aforesaid service time $\lambda(W+L)$. Therefore, a packet cumulant in this part is equal to a value obtained by multiplying the overall service time with the arrival rate of mean packet unit time (i.e., $\lambda E[F_N]$). Thereby, an equitation $E[F_N]=\lambda V+\lambda E[F_N]$ can be obtained, from which a general formula of the data transmission interval can be obtained:

$$E[F_N] = \frac{\lambda(W+L)}{1-\lambda}.$$

Then, the base station can determine the sleep ratio relation $$\frac{W}{W+L+E[F_N]}$$

according to the sleep interval W, the sleep cycle interval W+L and the data transmission interval $E[F_N]$, and determine the transmission efficiency relation $$\frac{E[F_N]}{L+E[F_N]}$$

according to the listening interval L and the data transmission interval $E[F_N]$. On the other hand, because a mean waiting time of the packets during the sleep cycle interval W+L is $$\frac{W+L}{2},$$

a mean waiting time of the packets during the data transmission process is $$\frac{\lambda}{2(1-\lambda)}.$$

When the mean packet service time is 1, the packet delay relation can be obtained:

$$\frac{W+L}{2} + \frac{\lambda}{2(1-\lambda)} + 1.$$

Then, the base station can determine the optimal solutions of the relations respectively so that comparisons can be made after quantification. Furthermore, the optimal solution (i.e., the optimal sleep ratio relation) of the sleep ratio relation $$\frac{W}{W+L+E[F_N]}$$

is $1-\lambda$ as determined in a conventional way. In addition, if data transmission is carried out as soon as the listening duration begins, this means that no time is wasted in waiting during the listening interval. In this case, an optimal transmission efficiency can be obtained; that is, the optimal solution (i.e., the optimal transmission efficiency relation) of the transmission efficiency relation $$\frac{E[F_N]}{L+E[F_N]}$$

is 1. Furthermore, if the packets are not prepared to be sent until the end of the data transmission interval, it means that the packets are not wasting time while waiting either during the sleep cycle interval or the data transmission interval. In this case, the optimal solution (i.e., the optimal packet delay relation) of the packet delay relation $$\frac{W+L}{2} + \frac{\lambda}{2(1-\lambda)} + 1$$

is the basic mean packet service time (i.e., the aforesaid setting value 1).

Thereby, the base station can determine a measurement function:

$$S(W,\alpha,\beta,\gamma)=1-[\sigma_{SR}(1-\lambda)\alpha+\sigma_{EE}\beta+\sigma_{MPD}f]$$

according to the difference between the sleep ratio relation and the optimal sleep ratio relation, the first weight value $\alpha$, the difference between the transmission efficiency relation and the optimal transmission efficiency relation, the second weight value $\beta$, the difference between the packet delay relation and the optimal packet delay relation, and the third weight value $\gamma$ described above.

Here, $\sigma_{SR}$ represents the difference between the sleep ratio relation and the optimal sleep ratio relation, $\sigma_{EE}$ represents the difference between the transmission efficiency relation and the optimal transmission efficiency relation, $\sigma_{MPD}$ represents the difference between the packet delay relation and the optimal packet delay relation, and f represents a data frame time unit. Thus, if the optimal solution of the sleep interval W is desired to be obtained, the measurement function can be differentiated with respect to the sleep interval W directly when the arrival rate $\lambda$ of mean packet unit time of a specific network protocol is given:

$$\frac{d}{dW}S(W,\lambda,\alpha,\beta,\gamma) = \frac{L(\lambda^2 - 2\lambda + 1)}{(L+W)^2}\alpha + \left[\frac{\lambda}{L+\lambda W} - \frac{\lambda^2(L+W)}{(L+\lambda W)^2}\right]\beta - f\gamma.$$

Then, a solution of the sleep interval W is calculated when a value of $$\frac{d}{dW}S(W,\lambda,\alpha,\beta,\gamma)$$

is 0. The sleep interval W obtained herein is just a solution of the optimal sleep interval value. It shall be particularly appreciated that if the user thinks the influence of the sleep ratio relation is higher than those of the other two relations in a specific network environment, then a weight ratio may be set to be $\alpha:\beta:\gamma=3:1:1$ on a condition that a sum of the weights is 1 (i.e., $\alpha+\beta+\gamma=1$). In this way, the solution of the optimal sleep interval value obtained from the aforesaid equation can reflect the influence of the sleep ratio relation to a greater extent than the other two relations.

In the aforesaid exemplary example, the optimal solution of the sleep interval W is obtained when a specific arrival rate $\lambda$ of mean packet unit time is given. However, if the user desires to determine an optimal solution of the sleep interval W which is adapted for a plurality of network protocols simultaneously in an environment where the plurality of network protocols coexist (i.e., the arrival rate $\lambda$ of mean packet unit time varies greatly), then the measurement function can be integrated over the value of $\lambda$ in a range between 0 and 1 to obtain another measurement function:

$$S_{AVG}(W,\alpha,\beta,\gamma) = \int_0^1 \{1 - [\sigma_{SR}(1-\lambda)\alpha + \sigma_{EE}\beta + \sigma_{MPD}f]\}d\lambda$$

Thus, the optimal solution of the sleep interval W which is adapted for different network protocols can also be obtained by differentiating the measurement function $S_{AVG}(W,\alpha,\beta,\gamma)$ with respect to the sleep interval W directly:

$$\frac{d}{dW}S_{AVG}(W,\alpha,\beta,\gamma) =$$

$$\frac{3L}{(3W+3L)^2}\alpha - \left[\frac{(2L+W)(W - L(\ln(L+W) - \ln(L)))}{W^2} - \frac{1}{W}\right]\beta + f\gamma$$

Then, the calculation of a solution of the sleep interval W when a value of $$\frac{d}{dW}S_{AVG}(W,\alpha,\beta,\gamma)$$

is 0. The solution of the sleep interval W obtained herein is just a solution of the optimal sleep interval value.

Figure 3:
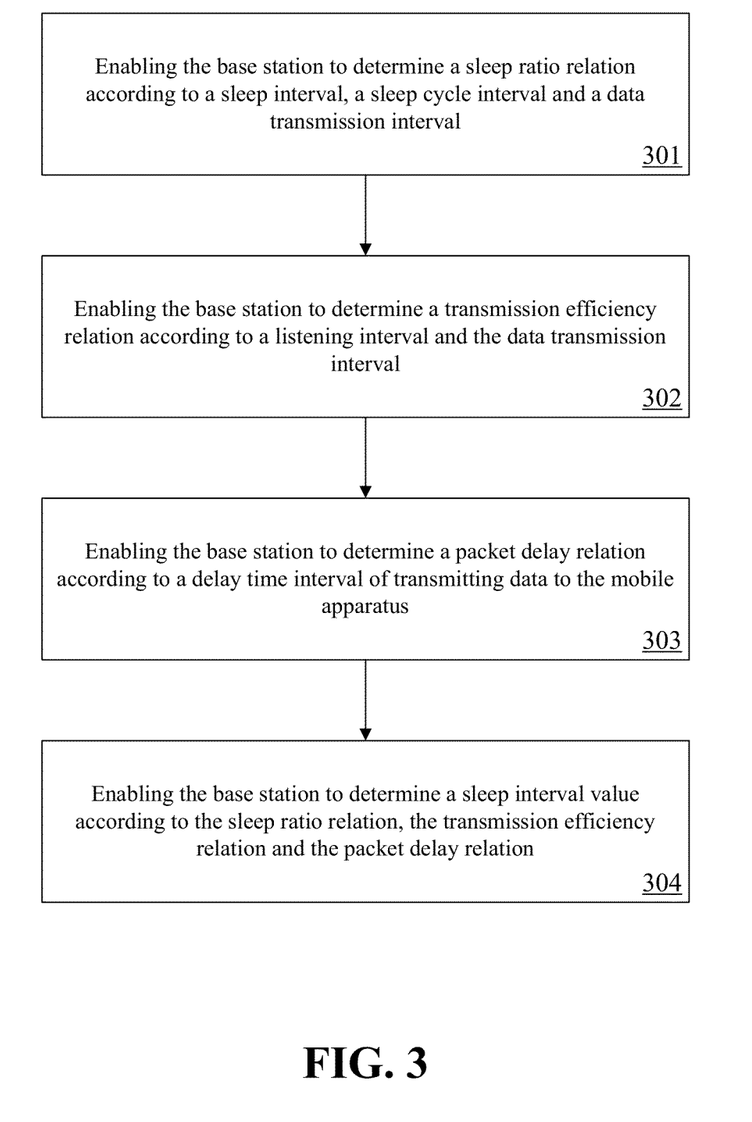
FIG. 3 is a flowchart diagram of a non-real time data transmission method according to a second embodiment of the present invention.

A second embodiment of the present invention is a non-real time data transmission method of the present invention; a flowchart diagram of which is shown in FIG. 3. The method according to the second embodiment is for use in a base station (e.g., the base station described in the aforesaid embodiment). The base station connects to a mobile apparatus via a network and exchanges data with the mobile apparatus during a data transmission interval. The base station records a sleep cycle interval, which comprises a sleep interval and a listening interval. Hereinbelow, the detailed steps of the non-real time data transmission method according to the second embodiment will be described in detail.

First, because a ratio of the sleep interval to the whole duration of the sleep mode is an important factor for saving power and transmitting data, step 301 is executed to enable the base station to determine a sleep ratio relation according to the sleep interval, the sleep cycle interval and the data transmission interval. The sleep ratio relation represents the ratio of the sleep interval to the whole duration of the sleep mode. Furthermore, because a ratio of the data transmission interval to an overall non-sleep time is also an important factor for saving power and transmitting data, step 302 is executed to enable the base station to determine a transmission efficiency relation according to the listening interval and the data transmission interval. The transmission efficiency relation represents the ratio of the data transmission interval to the non-sleep time.

Next, because the delay time of transmitting data from the base station to the mobile apparatus is also an important factor that affects the overall sleep interval, step 303 is executed to enable the base station to determine a packet delay relation according to a delay time interval of transmitting data to the mobile apparatus. Finally, because the sleep ratio relation, the transmission efficiency relation and the packet delay relation are the three most important factors that affect the balance between saving power and transmitting data, step 304 is executed to enable the base station to determine a sleep interval value of the sleep interval according to the sleep ratio relation, the transmission efficiency relation and the packet delay relation. In this way, the base station can inform the mobile apparatus about the sleep interval value that needs to be used (i.e., the actual length of the sleep interval), and exchange data with the mobile apparatus subsequently according to the sleep interval value.

Similarly, because the sleep ratio relation, the transmission efficiency relation and the packet delay relation described above each have an optimal solution, the optimal solutions of the relations may be further used in the non-real time data transmission method of present invention as indices for determining the sleep interval value. Likewise, because non-real time data of different protocols may have different requirements on the aforesaid factors, the weight values may also be used to adjust the sleep interval value according to the importance of the different factors.

Figure 4A:
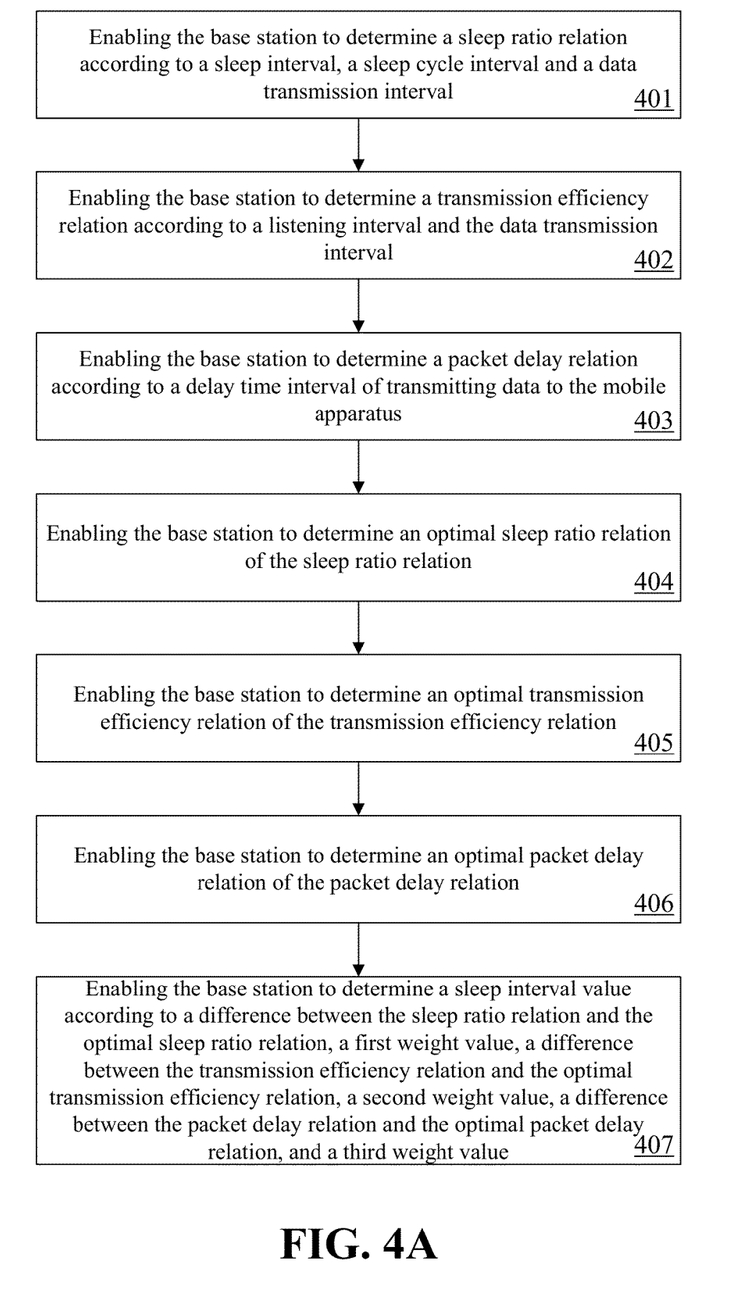
FIG. 4A is a flowchart diagram of a non-real time data transmission method according to a third embodiment of the present invention.

FIG. 4 illustrates a flowchart diagram of a non-real time data transmission method according to a third embodiment of the present invention. A base station in the third embodiment is similar to that in the second embodiment except that the base station in the third embodiment further stores a first weight value, a second weight value and a third weight value inputted by the user. The first weight value is related to the sleep ratio relation and is used to adjust a weight of the sleep ratio relation; the second weight value is related to the transmission efficiency relation and is used to adjust a weight of the transmission efficiency relation; and the third weight value is related to the packet delay relation and is used to adjust a weight of the packet delay relation.

Similar to that of the second embodiment, the non-real time data transmission method according to the third embodiment begins with step 401 to enable the base station to determine a sleep ratio relation according to the sleep interval, the sleep cycle interval and the data transmission interval. Next, step 402 is executed to enable the base station to determine a transmission efficiency relation according to the listening interval and the data transmission interval. Then, step 403 is executed to enable the base station to determine a packet delay relation according to a delay time interval of transmitting data to the mobile apparatus.

Subsequently, step 404 is executed to enable the base station to determine an optimal sleep ratio relation of the sleep ratio relation. Afterwards, step 405 is executed to enable the base station to determine an optimal transmission efficiency relation of the transmission efficiency relation. Thereafter, step 406 is executed to enable the base station to determine an optimal packet delay relation of the packet delay relation. Finally, step 407 is executed to enable the base station to determine the sleep interval value according to the difference between the sleep ratio relation and the optimal sleep ratio relation, the first weight value, the difference between the transmission efficiency relation and the optimal transmission efficiency relation, the second weight value, the difference between the packet delay relation and the optimal packet delay relation, and the third weight value.

Similarly, the non-real time data transmission method according to the third embodiment will be detailed with reference to an exemplary calculation process hereinbelow. In detail, when the data transmission interval $E[F_N]$ is $$\frac{\lambda(W+L)}{1-\lambda}$$

in the third embodiment, the sleep ratio relation is $$\frac{W}{W+L+E[F_N]},$$

the optimal sleep ratio relation is $1-\lambda$, the transmission efficiency relation is $$\frac{E[F_N]}{L+E[F_N]},$$

and the optimal transmission efficiency relation is 1. The optimal packet delay relation is 1 when the packet delay relation is $$\frac{(W+L)}{2}+\frac{\lambda}{2(1-\lambda)}+1.$$

Here, $\lambda$ represents an arrival rate of mean packet unit time, W represents the sleep interval, and L represents the listening interval.

Figure 4B:
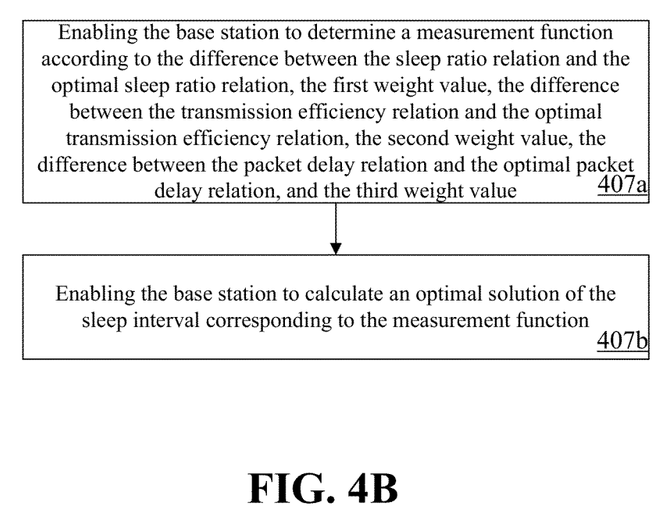
FIG. 4B is a flowchart diagram of the non-real time data transmission method according to the third embodiment of the present invention.

FIG. 4B illustrates another flowchart diagram of the non-real time data transmission method according to the third embodiment of the present invention. In detail, if the optimal solution of the sleep interval W is desired, then step 407 may be further divided into steps 407a and 407b when the specific arrival rate $\lambda$ of mean packet unit time of a specific network protocol is given. Step 407a is executed to enable the base station to determine a measurement function:

$$S(W,\alpha,\beta,\gamma)=1-[\sigma_{SR}(1-\lambda)\alpha+\sigma_{EE}\beta+\sigma_{MPD}f\gamma]$$

according to the difference between the sleep ratio relation and the optimal sleep ratio relation, the first weight value, the difference between the transmission efficiency relation and the optimal transmission efficiency relation, the second weight value, the difference between the packet delay relation and the optimal packet delay relation, and the third weight value.

Here, $\sigma_{SR}$ represents the difference between the sleep ratio relation and the optimal sleep ratio relation, $\sigma_{EE}$ represents the difference between the transmission efficiency relation and the optimal transmission efficiency relation, $\sigma_{MPD}$ represents the difference between the packet delay relation and the optimal packet delay relation, $\alpha$ represents the first weight value, $\beta$ represents the second weight value, $\gamma$ represents the third weight value, and f represents a data frame time unit. Then, step 407b is executed to enable the base station to calculate an optimal solution of the sleep interval corresponding to the measurement function. That is, the measurement function may be differentiated with respect to the sleep interval directly to obtain the optimal solution, and the optimal solution of the sleep interval corresponding to the measurement function is just the sleep interval value.

Figure 4C:
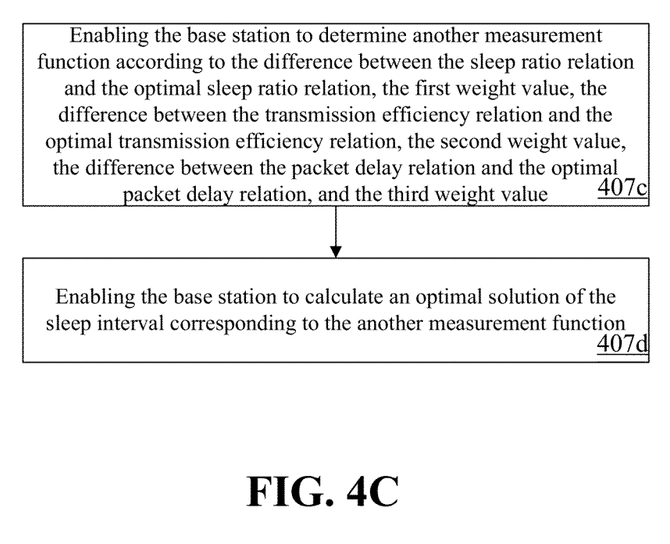
FIG. 4C is a flowchart diagram of the non-real time data transmission method according to the third embodiment of the present invention.

On the other hand, FIG. 4C shows a further flowchart diagram of the non-real time data transmission method according to the third embodiment of the present invention. In detail, if the user desires to determine an optimal solution of the sleep interval which is adapted for a plurality of network protocols simultaneously in an environment where the plurality of network protocols coexist (i.e., the arrival rate $\lambda$ of mean packet unit time varies greatly), then step 407 may similarly be further divided into steps 407c and 407d. Step 407c is executed to enable the base station to determine a measurement function:

$$S_{AvG}(W,\alpha,\beta,\gamma)=\int_0^1\{1-[\sigma_{SR}(1-\lambda)\alpha+\sigma_{EE}\beta+\sigma_{MPD}f\gamma]\}d\lambda$$

according to the difference between the sleep ratio relation and the optimal sleep ratio relation, the first weight value, the difference between the transmission efficiency relation and the optimal transmission efficiency relation, the second weight value, the difference between the packet delay relation and the optimal packet delay relation, and the third weight value.

Similarly, $\sigma_{SR}$ represents the difference between the sleep ratio relation and the optimal sleep ratio relation, $\sigma_{EE}$ represents the difference between the transmission efficiency relation and the optimal transmission efficiency relation, $\sigma_{MPD}$ represents the difference between the packet delay relation and the optimal packet delay relation, $\alpha$ represents the first weight value, $\beta$ represents the second weight value, $\gamma$ represents the third weight value, and f represents a data frame time unit. Then, the step 407d is executed to enable the base station to calculate an optimal solution of the sleep interval corresponding to the measurement function. That is, differentiation may be made with respect to the sleep interval of the measurement function directly to obtain the optimal solution, and the optimal solution of the sleep interval corresponding to the measurement function is just the sleep interval value.

According to the above descriptions, the base station and the non-real time data transmission method thereof of the present invention dynamically adjust the length of the sleep interval through use of a specific measurement function according to the ratio of the sleep interval to a sleep cycle, efficiency of data transmission after a listening interval and a packet transmission delay status. Thus, an appropriate balance between a saving power and having short data transmission time delays can be obtained during the process of transmitting non-real time data.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A non-real time data transmission method for use in a base station, the base station connecting to a mobile apparatus via a network, the base station recording a sleep cycle interval which comprises a sleep interval and a listening interval, and the base station exchanging data with the mobile apparatus during a data transmission interval, the non-real time data transmission method comprising the following steps:

(a) enabling the base station to determine a sleep ratio relation according to the sleep interval, the sleep cycle interval and the data transmission interval;

(b) enabling the base station to determine a transmission efficiency relation according to the listening interval and the data transmission interval;

(c) enabling the base station to determine a packet delay relation according to a delay time interval of transmitting data to the mobile apparatus; and (d) enabling the base station to determine a sleep interval value according to the sleep ratio relation, the transmission efficiency relation and the packet delay relation.

2. The non-real time data transmission method as claimed in claim 1, wherein the base station further stores a first weight value related to the sleep ratio relation, a second weight value related to the transmission efficiency relation and a third weight value related to the packet delay relation, and the non-real time data transmission method further comprises the following steps after the step (c):

(e) enabling the base station to determine an optimal sleep ratio relation of the sleep ratio relation;

(f) enabling the base station to determine an optimal transmission efficiency relation of the transmission efficiency relation; and (g) enabling the base station to determine an optimal packet delay relation of the packet delay relation;

wherein, in the step (d), the base station further determines the sleep interval value according to a difference between the sleep ratio relation and the optimal sleep ratio relation, the first weight value, a difference between the transmission efficiency relation and the optimal transmission efficiency relation, the second weight value, a difference between the packet delay relation and the optimal packet delay relation, and the third weight value.

3. The non-real time data transmission method as claimed in claim 2, wherein the data transmission interval is $$E[F_N] = \frac{\lambda(W+L)}{1-\lambda},$$

the sleep ratio relation is $$\frac{W}{W+L+E[F_N]},$$

the optimal sleep ratio relation is $1-\lambda$, the transmission efficiency relation is $$\frac{E[F_N]}{L+E[F_N]},$$

the optimal transmission efficiency relation is 1, the packet delay relation is $$\frac{W+L}{2} + \frac{\lambda}{2(1-\lambda)} + 1,$$

the optimal packet delay relation is 1, $\lambda$ represents an arrival rate of mean packet unit time, W represents the sleep interval, L represents the listening interval, and the step (d) further comprises:

(d1) enabling the base station to determine a measurement function:

$$S(W,\alpha,\beta,\gamma)=1-[\sigma_{SR}(1-\lambda)\alpha+\sigma_{EE}\beta+\sigma_{MPD}f]$$

according to the difference between the sleep ratio relation and the optimal sleep ratio relation, the first weight value, the difference between the transmission efficiency relation and the optimal transmission efficiency relation, the second weight value, the difference between the packet delay relation and the optimal packet delay relation, and the third weight value;

wherein $\sigma_{SR}$ represents the difference between the sleep ratio relation and the optimal sleep ratio relation, $\sigma_{EE}$ represents the difference between the transmission efficiency relation and the optimal transmission efficiency relation, $\sigma_{MPD}$ represents the difference between the packet delay relation and the optimal packet delay relation, $\alpha$ represents the first weight value, $\beta$ represents the second weight value, $\gamma$ represents the third weight value, and f represents a data frame time unit; and (d2) enabling the base station to calculate an optimal solution of the sleep interval corresponding to the measurement function, wherein the optimal solution of the sleep interval corresponding to the measurement function is the sleep interval value.

4. The non-real time data transmission method as claimed in claim 2, wherein the data transmission interval is $$E[F_N] = \frac{\lambda(W+L)}{1-\lambda},$$

the sleep ratio relation is $$\frac{W}{W+L+E[F_N]},$$

the optimal sleep ratio relation is $1-\lambda$, the transmission efficiency relation is $$\frac{E[F_N]}{L+E[F_N]},$$

the optimal transmission efficiency relation is 1, the packet delay relation is $$\frac{(W+L)}{2} + \frac{\lambda}{2(1-\lambda)} + 1,$$

the optimal packet delay relation is 1, $\lambda$ represents an arrival rate of mean packet unit time, W represents the sleep interval, L represents the listening interval, and the step (d) further comprises:

(d1) enabling the base station to determine a measurement function:

$$S_{AvG}(W,\alpha,\beta,\gamma) = \int \{1 - [\sigma_{SR}(1-\lambda)\alpha + \sigma_{EE}\beta + \sigma_{MPD}f]\} d\lambda$$

according to the difference between the sleep ratio relation and the optimal sleep ratio relation, the first weight value, the difference between the transmission efficiency relation and the optimal transmission efficiency relation, the second weight value, the difference between the packet delay relation and the optimal packet delay relation, and the third weight value;

wherein, $\sigma_{SR}$ represents the difference between the sleep ratio relation and the optimal sleep ratio relation, $\sigma_{EE}$ represents the difference between the transmission efficiency relation and the optimal transmission efficiency relation, $\sigma_{MPD}$ represents the difference between the packet delay relation and the optimal packet delay relation, $\alpha$ represents the first weight value, $\beta$ represents the second weight value, $\gamma$ represents the third weight value, and f represents a data frame time unit; and (d2) enabling the base station to calculate an optimal solution of the sleep interval corresponding to the measurement function, wherein the optimal solution of the sleep interval corresponding to the measurement function is the sleep interval value.

5. A base station for a non-real time data transmission, the base station connecting to a mobile apparatus via a network and exchanging data with the mobile apparatus during a data transmission interval, the base station recording a sleep cycle interval which comprises a sleep interval and a listening interval, and the base station comprising:

a transceiver, being configured to exchange data with the mobile apparatus during the data transmission interval via the network;

a memory, being configured to store the sleep interval and the listening interval which are comprised in the sleep cycle interval; and a processor;

wherein the processor is configured to determine a sleep ratio relation according to the sleep interval, the sleep cycle interval and the data transmission interval, the processor is further configured to determine a transmission efficiency relation according to the listening interval and the data transmission interval, the processor is further configured to determine a packet delay relation according to a delay time interval of transmitting data to the mobile apparatus, and the processor is further configured to determine a sleep interval value according to the sleep ratio relation, the transmission efficiency relation and the packet delay relation.

6. The base station as claimed in claim 5, wherein the memory is further configured to store a first weight value related to the sleep ratio relation, a second weight value related to the transmission efficiency relation and a third weight value related to the packet delay relation, the processor is further configured to determine an optimal sleep ratio relation of the sleep ratio relation, an optimal transmission efficiency relation of the transmission efficiency relation and an optimal packet delay relation of the packet delay relation, and the processor is further configured to determine a sleep interval value according to a difference between the sleep ratio relation and the optimal sleep ratio relation, the first weight value, a difference between the transmission efficiency relation and the optimal transmission efficiency relation, the second weight value, a difference between the packet delay relation and the optimal packet delay relation, and the third weight value.

7. The base station as claimed in claim 6, wherein the data transmission interval is $$E[F_N] = \frac{\lambda(W+L)}{1-\lambda},$$

the sleep ratio relation is $$\frac{W}{W+L+E[F_N]},$$

the optimal sleep ratio relation is $1-\lambda$, the transmission efficiency relation is $$\frac{E[F_N]}{L+E[F_N]},$$

the optimal transmission efficiency relation is 1, the packet delay relation is $$\frac{(W+L)}{2} + \frac{\lambda}{2(1-\lambda)} + 1,$$

the optimal packet delay relation is 1, $\lambda$ represents an arrival rate of mean packet unit time, W represents the sleep interval, L represents the listening interval, and the processor is further configured to determine a measurement function:

$$S(W,\alpha,\beta,\gamma) = 1 - [\sigma_{SR}(1-\lambda)\alpha + \sigma_{EE}\beta + \sigma_{MPD}f]$$

according to the difference between the sleep ratio relation and the optimal sleep ratio relation, the first weight value, the difference between the transmission efficiency relation and the optimal transmission efficiency relation, the second weight value, the difference between the packet delay relation and the optimal packet delay relation, and the third weight value;

$$S(W,\alpha,\beta,\gamma) = 1 - [\sigma_{SR}(1-\lambda)\alpha + \sigma_{EE}\beta + \sigma_{MPD}f]$$

wherein, $\sigma_{SR}$ represents the difference between the sleep ratio relation and the optimal sleep ratio relation, $\sigma_{EE}$ represents the difference between the transmission efficiency relation and the optimal transmission efficiency relation, $\sigma_{MPD}$ represents the difference between the packet delay relation and the optimal packet delay relation, $\alpha$ represents the first weight value, $\beta$ represents the second weight value, $\gamma$ represents the third weight value, the processor is further configured to calculate an optimal solution of the sleep interval corresponding to the measurement function, and the optimal solution of the sleep interval corresponding to the measurement is the sleep interval value.

8. The base station as claimed in claim 6, wherein the data transmission interval is $$E[F_N] = \frac{\lambda(W+1)}{1-\lambda},$$

the sleep ratio relation is $$\frac{W}{W+L+E[F_N]},$$

the optimal sleep ratio relation is 1-λ, the transmission efficiency relation is $$\frac{E[F_N]}{L+E[F_N]},$$

the optimal transmission efficiency relation is 1, the packet delay relation is $$\frac{(W+L)}{2} + \frac{\lambda}{2(1-\lambda)} + 1,$$

the optimal packet delay relation is 1, λ represents an arrival rate of mean packet unit time, W represents the sleep interval, L represents the listening interval, the processor is further configured to determine a measurement function:

$$S_{AvG}(W,\alpha,\beta,\gamma) = \int \{1-[\sigma_{SR}(1-\lambda)\alpha + \sigma_{EE}\beta + \sigma_{MPD}f(]\}d\lambda$$

according to the difference between the sleep ratio relation and the optimal sleep ratio relation, the first weight value, the difference between the transmission efficiency relation and the optimal transmission efficiency relation, the second weight value, the difference between the packet delay relation and the optimal packet delay relation, and the third weight value;

wherein, $\sigma_{SR}$ represents the difference between the sleep ratio relation and the optimal sleep ratio relation, $\sigma_{EE}$ represents the difference between the transmission efficiency relation and the optimal transmission efficiency relation, $\sigma_{MPD}$ represents the difference between the packet delay relation and the optimal packet delay relation, α represents the first weight value, β represents the second weight value, γ represents the third weight value, the processor is further configured to calculate an optimal solution of the sleep interval corresponding to the measurement function, and the optimal solution of the sleep interval corresponding to the measurement function is the sleep interval value.

\* \* \* \* \*